July 22, 1952 G. M. ROGERS ET AL 2,604,114
MIXING VALVE
Filed July 4, 1945 2 SHEETS—SHEET 1
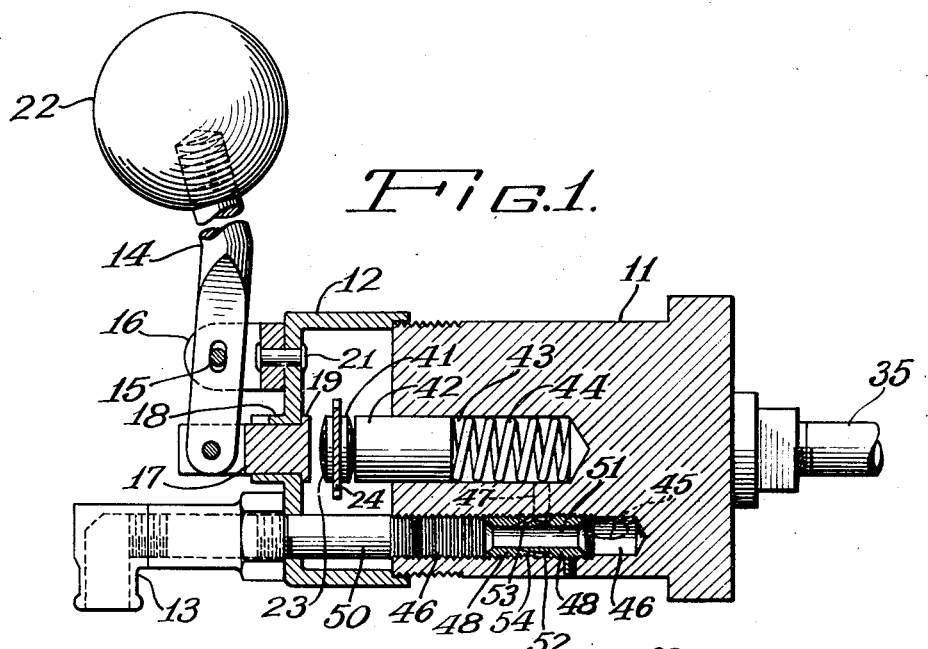
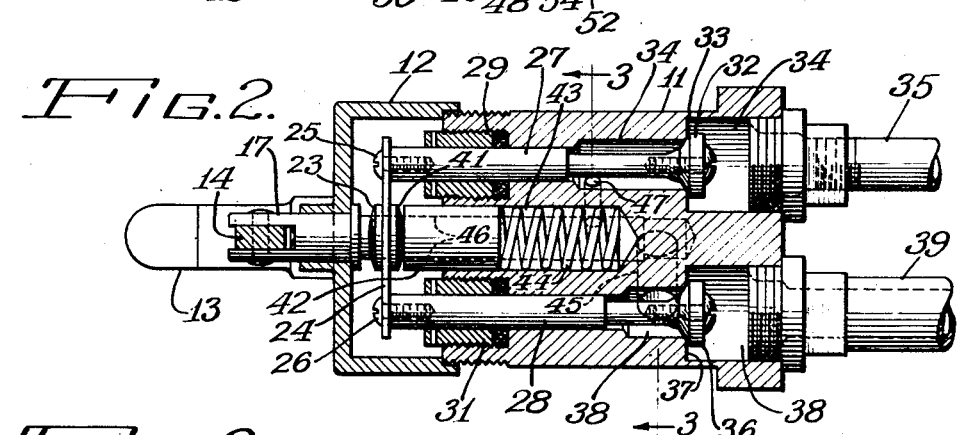
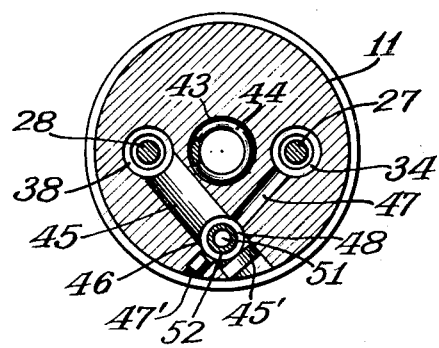
Inventors:
Gardiner M. Rogers
C. Osborn Mackey
By Carl S. Lloyd
Attorney

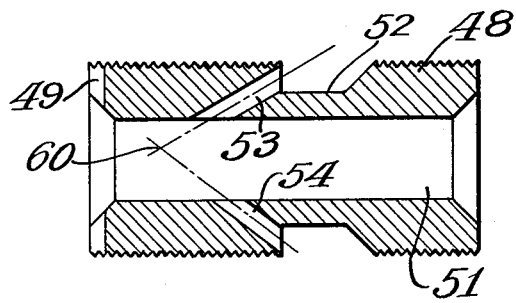
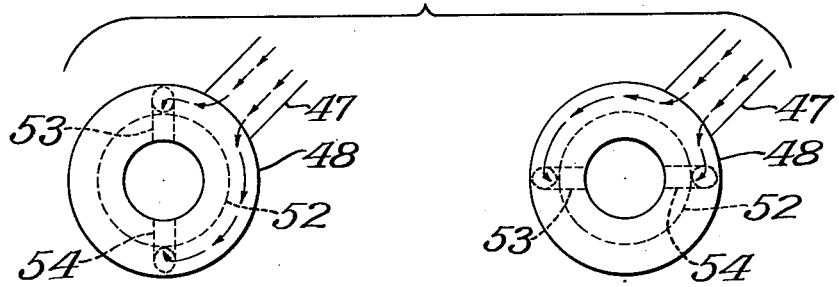
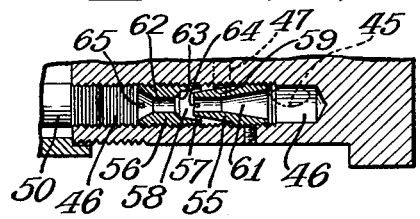
Inventors:
Gardiner M. Rogers
C. Osborn Mackey
By Carl X. Lloyd
Attorney Patented July 22, 1952

2,604,114

UNITED STATES PATENT OFFICE 2,604,114

MIXING VALVE

Gardiner M. Rogers and Charles Osborn Mackey, Ithaca, N. Y., assignors to Orange-Crush Company, Chicago, Ill., a corporation of Illinois Application July 4, 1945, Serial No. 603,196

3 Claims. (Cl. 137—604)

This invention relates to mixing valves such as are used in dispensing soft drinks at a counter or stand and it has for its general object the provision of an improved valve for this purpose which is particularly designed to automatically maintain a substantially constant ratio between the ingredients of the drink, such as syrup and water, irrespective of the temperature and pressure of such ingredients when delivered to the valve, and irrespective of the size of drink which is drawn on any particular operation of the valve.

A further object of the invention is to provide a mixing valve which is especially suited for dispensing a beverage containing pulp or other solid matter which might clog the passages and interfere with the efficient operation of the valve except for the provisions against this possibility which are made in the present construction.

An additional object is to provide a mixing valve of such construction that it may be reproduced in any desired quantities by standard manufacturing methods without variation in the operating characteristics or performance of different units.

Another object is to provide an efficient mixing valve which is relatively inexpensive to manufacture and which is highly reliable in service due to the fact that it is of simple and sturdy construction and has relatively few moving parts.

A still further object is to provide a valve for the purpose stated which may be easily adjusted to change the mix ratio, within certain limits, when this is desired.

Other objects and advantages of the invention will be apparent from the following description taken in connection with the accompanying drawings, in which:

Fig. 1 is a vertical sectional view of a valve in which our invention is embodied;

Fig. 2 is a horizontal sectional view thereof;

Fig. 3 is a transverse sectional view taken substantially on the section line 3—3 of Fig. 2;

Fig. 4 is an enlarged detail view of the combined nozzle and throat member which is shown in place in the valve in Fig. 1;

Fig. 5 is a diagrammatic view showing different rotary positions of said member in relation to the water inlet conduit; and Fig. 6 is a partial sectional view of the valve showing a modified form of mixing device.

The valve shown in said drawings comprises a body 11 of metal or other suitable material having a number of recesses and passages therein, to be later described, and a cap 12 screwed on the front end thereof, a faucet 13 and an operating handle 14 being positioned on the front of said cap. The handle 14 has a pin-and-slot connection 15 intermediate its ends with a bifurcated fulcrum post 16 and the lower end thereof is pivotally connected with a push rod 17 which is slidably mounted in a central opening in the cap 12. Said cap is formed with a flange 18 about said central opening to provide a bearing of substantial length for said push rod 17 and the inner end of the latter is flanged, as indicated at 19, to provide a shoulder adapted to abut against the inside of said cap 12 to limit the outward movement of said push rod.

The fulcrum post 16 is secured to the face of the cap 12 in the upper part thereof in any suitable manner, as by means of a rivet 21, and the operating handle 14 has a ball or other suitable hand-piece 22 on the upper end thereof.

The push rod 17 is so arranged that when it is pushed inwardly it will engage a contact button 23 on a plate 24, the ends of which are secured, as by means of screws 25 and 26, to valve stems 27 and 28, respectively, protruding from the front of the valve body 11, a liquid-tight seal between said valve stems and valve body being provided by means of packing glands 29 and 31.

The valve stem 27 carries a valve member 32 normally seated against a valve seat 33 in a multidimensional water inlet passage 34 communicably connected with a water inlet pipe 35 in which there is a head of water under pressure obtained by connection with city water pipes or in other desired manner.

The valve stem 28 carries a valve member 36 normally seated upon a valve seat 37 in a multidimensional syrup inlet passage 38 communicably connected with a syrup inlet pipe 39 leading from a reservoir (not shown) or other source of syrup adapted to be mixed with the water to form a finished drink.

On the opposite side of the plate 24 from the button 23 there is a button 41 (one or both of which may be omitted if desired) in engagement with the end of a plunger 42, the inner part of which is positioned in a socket 43 in which there is mounted a coil spring 44 normally urging said plunger 42 outwardly, thus holding the valves 32 and 36 seated through the medium of the plate 24 and the valve stems 27 and 28.

The syrup inlet passage 38 is communicably connected by means of a conduit 45 with a mixing and discharge passage 46 and the water inlet passage 34 is communicably connected with said mixing and discharge passage 46 by means of a conduit 47. The outer ends of the passage 45 and 47 are closed by plugs 45' and 47', respectively.

A pipe 50 having threaded end portions is screwed into the forward end of the passage 46 and connects the same with the faucet 13 which is screwed onto the outer end of said pipe.

In the form of the invention shown in Figs. 1 to 5 inclusive, a combined nozzle and throat member 48 is employed, such member being screwed into said passage 46, in which it may be properly located by means of a screwdriver engaging in a screwdriver slot 49 in the front end of said member. Said member has a central bore or passage 51 therein and is so located that the syrup enters the mixing and discharge passage 46 at a point at the rear of said member 48 so that it will pass through said passage 51, which is of quite large size in order that there will be no substantial restriction of the flow of the syrup even though it may contain considerable pulp or other solid matter.

A circumferential groove 52 is formed externally on said member 48 and this groove is disposed opposite the outlet of the water conduit 47 leading from the water inlet passage 34.

The member 48 is drilled to provide, as shown, two diagonal water passages 53 and 54 extending forwardly from the shoulder at the front end of the groove 52 and opening into the syrup passage 51. It will be understood that any desired number of such water passages might be provided and that for certain purposes one might be sufficient, but we have found that two such passages, arranged in substantially opposite positions, function satisfactorily for a mixing valve for the purpose hereinabove mentioned. Such passages are of relatively small size, being of substantially smaller cross-sectional dimension than the water inlet passage 34 and conduit 47 so that the velocity of the water will be substantially increased as it passes through said passages and the pressure thereof will be correspondingly reduced. Such increase in velocity will create suction in the passage 51 due to the transfer of momentum from the water stream to the column of syrup in this passage and will increase the velocity of the syrup and cause intermixture thereof with the water to form a homogeneous mixed drink which will then flow at the accelerated speed to the faucet 13.

With this construction the ratio of syrup to water will remain substantially constant, even in case of an increase in pressure in the water supply line (which may vary considerably for different installations). Such increase in pressure would normally tend to increase the richness of the mixture, i. e., the ratio of syrup to water, due at least in part to the greater velocity and momentum of the water which would result. However, this tendency is counteracted in the present construction by arranging the water passages 53 and 54 in such relationship that the components of the water stream passing respectively through said passages will converge in the passage 51 and impinge upon each other to thereby dissipate some of the kinetic energy of the water as turbulence in the stream, such turbulence tending to interfere with the normal increase in the momentum transferred from the water to the syrup and tending to prevent a disproportionate increase in the suction. Consequently increase in the pressure of the water in the supply line will not materially increase the richness of the mixture.

To further increase the turbulence in the water stream, we preferably arrange the water passages 53 and 54 at slightly different angles, with the result that the point of intersection of the converging components of the stream (indicated by the numeral 60) is somewhat off the axial center of the passage 51, the direction of the streams being indicated in Fig. 4 by dot-and-dash lines. While the relative angles of the water restricting passages might be varied within rather wide limits, we have found that an efficient arrangement is to have one of the passages, as the passage 53, at an angle of say, 30° and the other passage 54 at an angle of say, 35°. It has been found through tests that the amount of turbulence created when the passages are at different angles is substantially greater than when they are at the same angles, this being due perhaps to the fact that when the point of intersection of the components of the stream is off the axial center of the passage, and consequently nearer the wall at one side, the wall will have a greater baffling effect than if the point of intersection were at the axial center of the passage.

Upon completion of the mixing of the syrup and water the finished drink flows forwardly in the passage 46 and through the pipe 50 onto the forward end of which the faucet 13 is screwed, it being understood that a glass or other receptacle will be positioned beneath said faucet to receive the drink.

In Fig. 5 we have shown the member 48 diagrammatically in two different positions of rotary adjustment in relation to the water inlet conduit 47. In the view at the left of the figure, the passages 53 and 54 are shown with their inlet ends at the top and bottom of the view, respectively, and with the passage 53 nearest the water inlet conduit 47. Assuming that the latter is arranged with its center in a direct radial line with respect to the axis of the member 48 so that swirl may be disregarded, there will be a more direct flow of the water into the passage 53 than into the passage 54 and consequently a larger proportion of the water will pass through this passage than through said passage 54. Since the passage 53 is at a flatter angle with respect to the direction of travel of the syrup in the passage 51, there will be a greater transfer of momentum from the water stream to the syrup than if the passage were arranged at a steeper angle to the horizontal, and this will result in a somewhat richer mixture than would be the case if the passage 54 were positioned nearest the conduit 47.

In the view at the right of said Fig. 5 the member 48 has been turned a quarter turn in counterclockwise direction from the position shown at the left, with the result that the passage 54 is now nearer to the conduit 47 than is the passage 53; consequently the larger relative amount of water will pass through the passage 54, and since the angle of this passage to the horizontal is steeper than the angle of the passage 53, there will be less transfer of momentum to the syrup with the result that the mixture will not be so rich as when the water passages are arranged in the position shown in the left-hand view.

It has been found by experimentation that, within certain limits, the richness of the mixture may be controlled quite exactly by varying the rotary position of the member 48, which can easily be done by means of a screwdriver inserted from the forward end of the passage 46 into the slot 49 on the front of said member 48.

It should be borne in mind, however, that the results may be varied considerably if the inlet conduit 47 should not be arranged to deliver the water in an exact radial direction with respect to the axis of the member 48, since then the swirl factor would have to be taken into account and mere distance of the respective water passages from the inlet conduit would not be the sole criterion.

In the form of the invention shown in Fig. 6 of the drawings, the mixing device comprises two separate members each screwed into the passage 46. Said members are identified by the reference numerals 55 and 56, respectively.

The forward portion of the member 55 is of conical form and the rear end of the member 56 is recessed to receive the tip of said member 55, with a restricted space 57 between said tip and the wall of the recess, numbered 58, in said member 56. Said restricted space 57 may be regarded as the nozzle corresponding to the nozzle provided by the passages 53 and 54 in the member 48 of the first-described embodiment of the invention.

The water enters the passage 46 at a point opposite the conical forward portion of the member 55, the point of entry being indicated at 59 in said Fig. 6, and flows forwardly over the tip of said member 55 in an infinite number of small streams converging towards each other, the velocity of such streams being increased and the water pressure being correspondingly reduced by the restriction of the narrow space 57.

The syrup enters the passage 46 at the rear of said member 55 and passes through a central opening 61 in said member 55, thence into the recess 58 in the member 56 and through a central passage 62 in said member 56. Said passages 61 and 62 are large enough to prevent any clogging regardless of the consistency of the syrup.

As in the case of the other form of the invention, there is a transfer of momentum from the incoming water stream to the syrup flowing through the passages 61, 58, and 62 and this serves to bring about a thorough intermixture of the syrup and water and the propulsion of the mixture through the forward portion of the passage 46 and the pipe 50 to the faucet 13.

The water streams passing over the tip of the member 55 would converge and impinge upon each other if the recess 58 in the member 56 were so shaped as to provide sufficient clearance for this purpose, but in the construction shown a shoulder 63 is provided at the forward end of the recess 58 and is located in such position that the water streams passing through the restricted space 57 impinge upon said shoulder, which thus serves as a baffle to direct the water streams inwardly toward each other. The impact of the streams with said shoulder and with each other creates a turbulent condition which serves to prevent any substantial increase in the richness of the mixture due to increase in the pressure of the water entering the valve through the supply pipe 35. Such counteracting effect is produced by thus preventing an increase in momentum proportionate to the increase in velocity resulting from the greater head pressure of the water.

The baffle 63 may not be necessary in all cases and if desired it could be eliminated in the manner above mentioned, in which case the desired turbulence would be obtained by intersection of the converging streams of water, as in the case of the first-described form of the invention, but we have found that it is desirable, at least for certain uses of the valve, to provide the baffle when the form of the invention shown in Fig. 6 is employed.

It will be understood that if desired a baffle could also be provided in the member 48 of the other form of the invention, but this has not been found necessary, particularly when water passages, such as the passages 53 and 54, of unequal angles are employed.

The members 55 and 56 in the form of the invention shown in Fig. 6 are provided with screwdriver slots 64 and 65, respectively, for ready adjustment of said members in the passage 46, and it will be evident that the richness of the mixture may be controlled by change of the relative positions of these two members, the mixture becoming leaner as the member 56 is moved away from the member 55.

While we have shown only two modifications of the invention, it will be evident that its principles could also be embodied in other specific forms. The form selected for any particular use will, of course, depend upon the special problems involved. We have found that the constructions herein shown and described, particularly the construction of Figs. 1-5 of the drawings, are especially well suited for dispensing a beverage made from a syrup containing a considerable amount of pulp, such as fruit particles, since neither the relatively large straight-through syrup passage 51 in the member 48 nor the passages 61 and 62 in the members 55 and 56 are likely to become clogged under any conditions of use of the valve and there are no other passages or recesses which would tend to retain deposits of the pulp.

The provision for uniformity of the mix ratio regardless of changing temperature and pressure conditions and irrespective of the amount of the drink which is drawn on any particular operation and the provision for counteracting the normal tendency for the richness of the mixture to be increased with an increase in the pressure of the water in the supply line are other features of practical commercial importance.

The foregoing detailed description has been given for clearness of understanding only, and no unnecessary limitations should be understood therefrom, but the appended claims should be construed as broadly as permissible in view of the prior art.

We claim:

1. A mixing valve for beverages or the like comprising a valve body having formed therein a syrup inlet passage, a water inlet passage, a mixing and discharge passage and connecting conduits between said inlet passages and said mixing and discharge passage, normally closed valves in said inlet passages, a valve operating member whereby both said valves may be unseated to permit continuous flow of said syrup and water to said mixing and discharge passage for such time as may be necessary to draw a drink of the size desired, and a mixing and liquid proportioning device positioned in said mixing and discharge passage, said device comprising a nozzle having a central syrup passage extending lengthwise therethrough and a plurality of forwardly extending diagonal water passages through the wall of said nozzle through which the water may pass from said water conduit into said syrup passage, said diagonal water passages being of smaller cross-sectional dimension than said water inlet passage and connecting conduit whereby the velocity of incoming water will be increased and its pressure correspondingly reduced as it passes through said diagonal passages, such increase of velocity of the water creating suction in said central syrup passage due to the transfer of momentum from the water stream to the syrup, thus causing the syrup to be entrained with the water stream to form therewith a homogeneous mixture of predetermined proportions which then flows to a point of discharge from said mixing and discharge passage, said diagonal water passages being arranged in converging relationship and in such relative positions as to cause jets of water passing therethrough to interact with each other at a point off the axial center of said syrup passage in the nozzle, such interaction creating a turbulent condition of the water in the area of its contact and intermixture with the syrup.

2. A mixing valve for beverages or the like comprising a valve body having formed therein a syrup inlet passage, a water inlet passage, a mixing and discharge passage and connecting conduits between said inlet passages and said mixing and discharge passage, normally closed valves in said inlet passages, a valve operating member whereby both said valves may be unseated to permit continuous flow of said syrup and water to said mixing and discharge passage for such time as may be necessary to draw a drink of the size desired, and a mixing and liquid proportioning device positioned in said mixing and discharge passage, said device comprising a nozzle having a central syrup passage extending lengthwise therethrough and a plurality of forwardly extending diagonal water passages through the wall of said nozzle through which the water may pass from said water conduit into said syrup passage, said diagonal water passages being of smaller cross-sectional dimension than said water inlet passage and connecting conduit whereby the velocity of incoming water will be increased and its pressure correspondingly reduced as it passes through said diagonal passages, such increase of velocity of the water creating suction in said central syrup passage due to the transfer of momentum from the water stream to the syrup, thus causing the syrup to be entrained with the water stream to form therewith a homogeneous mixture of predetermined proportions which then flows to a point of discharge from said mixing and discharge passage, said diagonal water passages being arranged in converging relationship and at unequal angles to the axis of the nozzle syrup passage to thereby cause jets of water passing therethrough to impinge upon each other at a point off the axial center of said syrup passage in the nozzle, such impingement creating a turbulent condition of the water in the area of its contact and intermixture with the syrup, said nozzle being rotatably mounted in said valve body whereby one or the other of said diagonal passages may be selectively placed in closer proximity to said water inlet conduit than the other passage.

3. A mixing valve for beverages or the like comprising a valve body having formed therein a syrup inlet passage, a water inlet passage, a mixing and discharge passage and connecting conduits between said inlet passages and said mixing and discharge passage, normally closed valves in said inlet passages, a valve operating member whereby both said valves may be unseated to permit continuous flow of said syrup and water to said mixing and discharge passage for such time as may be necessary to draw a drink of the size desired, and a mixing and liquid proportioning device positioned in said mixing and discharge passage, said device comprising a nozzle having a central syrup passage extending lengthwise therethrough and a plurality of forwardly extending diagonal water passages through the wall of said nozzle through which the water may pass from said water conduit into said syrup passage, said diagonal water passages being of smaller cross-sectional dimension than said water inlet passage and connecting conduit whereby the velocity of incoming water will be increased and its pressure correspondingly reduced as it passes through said diagonal passages, such increase of velocity of the water creating suction in said central syrup passage due to the transfer of momentum from the water stream to the syrup, thus causing the syrup to be entrained with the water stream to form therewith a homogeneous mixture of predetermined proportions which then flows to a point of discharge from said mixing and discharge passage, said nozzle being rotatably mounted in said valve body whereby one or the other of said diagonal passages may be selectively placed in closer proximity to said water inlet conduit than the other passage.

GARDINER M. ROGERS.
C. OSBORN MACKEY.

REFERENCES CITED

The following references are of record in the file of this patent:

UNITED STATES PATENTS

| Number | Name | Date |
| --- | --- | --- |
| 127,984 | O'Rorke | June 18, 1872 |
| 336,398 | Desmond | Feb. 16, 1886 |
| 850,916 | Fitzgibbon | Apr. 23, 1907 |
| 1,036,871 | Matheson | Aug. 27, 1912 |
| 1,547,194 | Arbon | July 28, 1925 |
| 1,603,082 | Jacobs | Oct. 12, 1926 |
| 1,640,945 | Leibing | Aug. 30, 1927 |
| 1,743,738 | Travis | Jan. 14, 1930 |
| 2,078,361 | Zimmerman | Apr. 27, 1937 |
| 2,354,695 | McGlashan et al. | Aug. 1, 1944 |

FOREIGN PATENTS

| Number | Country | Date |
| --- | --- | --- |
| 8,444 | Great Britain | of 1895 |
| 48,482 | Sweden | of 1921 |
| 177,346 | Switzerland | of 1935 |